United States Patent [19]

Heel et al.

[11] Patent Number: 5,022,686
[45] Date of Patent: Jun. 11, 1991

[54] ROTATING UNION FOR TWO DIFFERENT FLUIDS

[75] Inventors: Helmut Heel, Lengenwang; Karl Bauch, Kempten; Bartholomäus Reisacher, Untrasried; Stefan Wörner, Kempten, all of Fed. Rep. of Germany

[73] Assignee: Ott Maschinentechnik GmbH, Kempten, Fed. Rep. of Germany

[21] Appl. No.: 430,737

[22] Filed: Nov. 2, 1989

[30] Foreign Application Priority Data

Nov. 11, 1988 [DE] Fed. Rep. of Germany ....... 3838303

[51] Int. Cl.[5] ............................................. F16L 39/04
[52] U.S. Cl. ..................................... 285/134; 285/136
[58] Field of Search ................ 285/136, 134, 190, 281

[56] References Cited

U.S. PATENT DOCUMENTS

| | | | |
|---|---|---|---|
| 2,805,087 | 9/1957 | Shaw et al. | 285/134 |
| 4,260,382 | 4/1981 | Thomson | 285/136 X |
| 4,422,676 | 12/1983 | Sitabkhan | 285/136 |
| 4,477,107 | 10/1984 | Ferguson et al. | 285/134 |
| 4,577,892 | 3/1986 | Wrülich et al. | 285/136 |
| 4,641,859 | 2/1987 | Walters | 285/281 X |
| 4,758,026 | 7/1988 | Timm | 285/134 |
| 4,781,215 | 11/1988 | Mayhall, Jr. et al. | 285/136 |
| 4,781,404 | 11/1988 | Tharp et al. | 285/136 X |
| 4,792,164 | 12/1988 | Suemitsu | 285/134 |
| 4,858,961 | 8/1989 | Nunogaki | 285/136 X |

Primary Examiner—Dennis L. Taylor
Assistant Examiner—J. Russell McBee
Attorney, Agent, or Firm—Flynn, Thiel, Boutell & Tanis

[57] ABSTRACT

The rotating union for two different fluids comprises a hollow shaft (2) mounted rotatably in a stationary housing (1), with two separate axial throughflow channels (4, 5). A slide ring packing assembly is provided between the hollow shaft (2) and two separate inlet channels (9, 17) provided in the housing (1) for the two fluids. This includes a common slide ring (8) which is connected at its face to the hollow shaft (2) and comprises a central bore (8a) and several axial passages (8b) arranged concentrically thereto, and in the housing (1) a central slide ring (11) and a slide ring (14) concentrically surrounding the latter. The concentric slide ring (14) comprises several axial passages (14a) which are arranged in a circle concentric to the axis of rotation (A) and connected to the inlet channel (17) for the second fluid. Between the outer circumference of the central slide ring (11) and the inner circumference of the concentric slide ring (14) is provided an annular chamber (18) extending as far as the sliding surface (8c) of the common slide ring (8) and communicating with an inlet channel (23) provided in the housing and an outlet channel (24).

9 Claims, 3 Drawing Sheets

ROTATING UNION FOR TWO DIFFERENT FLUIDS

FIELD OF THE INVENTION

The invention concerns a rotating union for two different fluids, in particular for machine tools, with a stationary housing, a hollow shaft mounted rotatably therein and comprising a central throughflow channel for the first fluid and at least one second throughflow channel parallel thereto for the second fluid, with two separate inlet channels provided in the housing for the two fluids and with a slide ring packing assembly which is provided between the latter and the hollow shaft and arranged coaxially with the axis of rotation and through which the fluids can be supplied separately to the throughflow channels, wherein the slide ring packing assembly includes a common slide ring for conducting both fluids which is connected at its face to the inner end of the hollow shaft and comprises a central bore and several axial passages arranged in a circle concentric to the axis of rotation, and in the housing a central slide ring, as well as a slide ring concentrically surrounding the latter, which are each held in non-relatively in, piston-like slide ring supports concentric to each other and axially displaceable in associated cylinder chambers in the housing, and can be biased axially against the sliding surface of the common slide ring independently of each other under spring pressure and the pressure of the respective fluid.

BACKGROUND OF THE INVENTION

In machine tool spindles, a clamping device (tool chuck) is frequently provided inside the hollow machine tool spindle. This clamping device comprises a connecting rod which extends coaxially with the spindle axis and the front end of which in the region of the tool holding fixture is provided with a collet chuck engaging the tool. Through the rear end of the connecting rod extends a hydraulically operating, so-called release unit which serves to operate the clamping device. So that a cooling lubricant can be supplied to the tool, the connecting rod is hollow and its end protruding from the release unit is connected to the central throughflow channel of the hollow shaft. The rotating union thus allows supply of the cooling lubricant from the stationary housing to the rotating connecting rod. On changing the tool, i.e. when the machine tool spindle is at a standstill, instead of cooling lubricant, air for blowing out the tool holding fixture can be passed through the rotating union and the connecting rod. While the machine tool spindle is at a standstill, hydraulic oil can be supplied at high pressure to the release unit via the second inlet channel, the slide ring packing assembly and the parallel second throughflow channel, whereby the release unit displaces the connecting rod in the machine tool spindle and the connecting rod releases the workpiece.

Rotating unions for two different fluids are well-known in the most varied designs and for the most varied purposes. A rotating union of the kind described hereinbefore, such as might be used for the purpose described in combination with machine tool spindles, is shown and described for example in catalogue 869 D "DEUBLIN ROTATING UNIONS" of the firm Deublin-Vertriebs-GmbH, D-6238 Hofheim-Wallau, page 36. This rotating union has various drawbacks when used for machine tool spindles as described. It is suitable for a maximum speed of only 1,500 r.p.m. But for machine tool spindles nowadays, maximum speeds of 30,000 r.p.m. or more are required. If wet and dry machining alternate with each other, then blowing the cooling lubricant out of the rotating union and the connecting rod every time the tool is changed is extremely troublesome. For the fact is that the workpieces or measuring tools, which are to be kept dry, are wetted with cooling lubricant. Moreover, the operator is annoyed by the liquid mist. It must be taken into consideration here that even in case of continuous dry machining in which no cooling lubricant is to be supplied to the tool, there must nevertheless be cooling lubricant in the rotating union so that the central slide ring is lubricated and frictional heat is conducted away. If there is no cooling lubricant at the slide ring packing, then the slide ring packing is soon destroyed, particularly at higher spindle speeds. Even in case of dry machining, therefore, cooling lubricant must be supplied to the rotating union again after every tool change after blowing out the tool holding fixture. So that this cooling lubricant does not pass to the tool during dry machining, in the connecting rod or hollow shaft is mounted a spring-loaded shut-off valve which shuts off the throughflow channel in the hollow shaft or hollow connecting rod during dry machining, in which the cooling lubricant is supplied to the rotating union at low pressure. This non-return valve however gives rise to further problems, for it also prevents, among other things, throughflow of the cooling lubricant during wet machining. Furthermore, the central slide ring is only cooled inadequately if a non-return valve is used, because no forced circulation of the cooling lubricant is provided. For this reason too, the known rotating union is not suitable for higher spindle speeds. Also, only the central slide ring separates the cooling lubricant flowing centrally through it, from the hydraulic oil surrounding it. So that the two fluids do not become mixed with each other, a relatively strong compression spring must act as a basic load on the inner slide ring support. This higher basic load then leads to unnecessarily high pressure of the central slide ring on the common slide ring during dry machining too, which is connected with corresponding generation of heat and wear. Lastly, in case of dry machining, on account of the necessary cooling and lubrication of the central slide ring by the cooling lubricant, it is not possible to operate with a supply of compressed air. But such supply of compressed air is sometimes desirable to cool the tool and the workpiece and remove cuttings.

It is therefore the object of the invention to provide a rotating union for two different fluids, in particular for machine tool spindles, of the kind mentioned hereinbefore, which is particularly suitable for very high speeds while avoiding the above drawbacks, in which throughflow through the central throughflow channel can take place unhindered, and which allows dry machining even at high speeds, if required with the supply of compressed air.

SUMMARY OF THE INVENTION

According to the invention, the object is achieved by the fact that the concentric slide ring comprises several axial passages which are arranged in a circle concentric to the axis of rotation and connected to the inlet channel for the second fluid via the cylinder chamber of the outer slide ring support carrying the concentric slide ring, that the common slide ring and/or the concentric slide ring in the region of the axial passages in the respective sliding surface is provided with an annular groove connecting the passages to each other, that between the outer circumference of the central slide ring and the inner circumference of the concentric slide ring is provided an annular chamber extending as far as the sliding surface of the common slide ring, that the outer slide ring support comprises an annular piston slidable in a third cylinder chamber of the housing, that the annular chamber communicates with the third cylinder chamber, and that in the housing are provided a third inlet channel and an outlet channel which communicate with the third cylinder chamber.

This new rotating union is suitable for particularly high speeds. In particular, the annular chamber provided between the specially designed concentric slide ring and the central slide ring contributes to this. Cooling lubricant or some other suitable fluid, which apart from heat-eliminating properties also has lubricating properties, can be supplied continously to this third annular chamber via the third inlet channel. This cooling lubricant cools all three slide rings excellently, as it passes directly to the inner circumference of the concentric slide ring, the sliding surface of the common slide ring and partly also to the central slide ring or its immediate vicinity. It is critical here that the heated cooling lubricant can leave the housing again via the outlet channel. Thus continuous circulation of the cooling lubricant and hence constant conduction of heat away from the slide rings are ensured. Moreover the cooling lubricant leads to lubrication of the sliding surfaces. In case of wet machining, a cooling lubricant can be passed to the tool through the central inlet channel and the central throughflow channel in a conventional manner. But it is just as good to operate dry without this cooling lubricant, or to pass compressed air instead of cooling lubricant through the central inlet channel and the central throughflow channel. A non-return valve in the connecting rod or the hollow shaft is no longer necessary. Thus the throughflow capacity of cooling lubricant or even compressed air is increased substantially, and other problems caused by the non-return valve are avoided. Furthermore, throughflow of the first and second fluids takes place in two slide rings completely separated from each other by the annular chamber. Should there be a leak at one of the slide rings, then the escaping fluid is conducted away via the annular chamber and cannot become mixed with the other fluid. Consequently it is possible to make the pressure springs for the two slide ring supports relatively weak. This leads in turn to a low basic load on the slide rings and less heating and less wear thereof, as long as the fluids are not supplied at high pressure during rotation. Moreover it is possible also to control the contact pressure of the concentric slide ring on the common slide ring by the cooling lubricant supplied to the annular chamber, as the annular piston surface facing away from the concentric slide ring can be subjected to the pressure of the cooling lubricant provided for cooling. Consequently it is possible to react to certain operative states e.g. strong vibration. Also it is possible to bias the concentric slide ring with only a low basic load against the common slide ring and, when hydraulic oil is to be supplied to the second throughflow channel while the machine tool spindle is at a standstill, to increase the contact pressure in addition by cooling lubricant. It is also particularly advantageous that during dry machining, e.g. when milling plastic, compressed air can be supplied to the tool even at high speeds.

BRIEF DESCRIPTION OF THE DRAWINGS

The invention is explained in more detail below with reference to embodiments shown in the drawings. These show.

DETAILED DESCRIPTION

Figure 1:
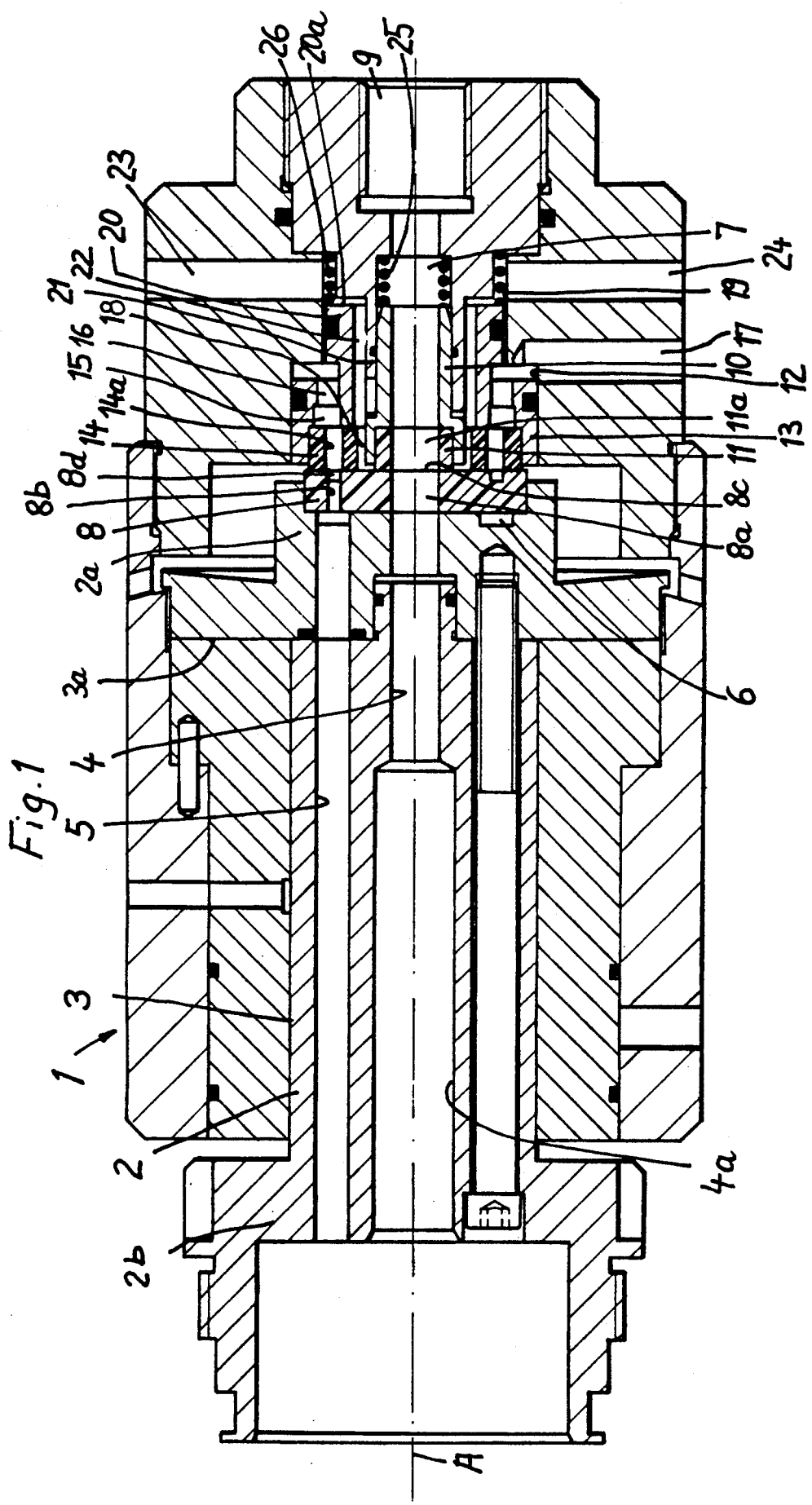
FIG. 1 an axial section of a first embodiment of the rotating union with aerostatic bearings, FIG. 2 an axial section of a second embodiment of the rotating union with rolling bearings, FIG. 3 a cross-section through line III—III of FIG. 2.

The hollow shaft 2 is mounted rotatably in a stationary housing 1 by means of the aerostatic plain bearing 3 and the aerostatic thrust bearing 3a. The aerostatic mounting is particularly suitable for high speeds of 30,000 to 60,000 r.p.m. The hollow shaft 2 comprises a central throughflow channel 4, in the extended portion 4a of which a connecting rod, not shown, of a clamping device, also not shown and disposed in a machine tool spindle, can be received. The hollow shaft comprises, parallel to the central throughflow channel 4, preferably three throughflow channels 5 distributed evenly over its cross-section. The outer end 2b of the hollow shaft 2 can be connected to a so-called release unit of the clamping device, wherein hydraulic oil is to be supplied at high pressure to this release unit via the throughflow channels 5 while the machine tool spindle is at a standstill.

At the inner end 2a of the hollow shaft 2, which in the embodiment shown is formed by a portion of the aerostatic thrust bearing, a slide ring 8 is disposed at an interface which is common to the inner end of the throughflow channels 4 and 5. This slide ring is rigidly connected to the end 2a in the manner described in more detail below.

The common slide ring 8 comprises a central bore 8a aligned with the throughflow channel 4 and several axial passages 8b arranged in a circle concentric to the axis of rotation A. These passages 8b communicate via the annular channel 6 with the throughflow channels 5, as far as they are not aligned with them at all. The common slide ring 8 also comprises in its sliding surface 8c, which extends in a radial plane, in the region of the axial passages 8b an annular groove 8d connecting the passages to each other. In a first cylinder chamber 7 provided in the housing 1, which communicates with the central inlet channel 9, the inner slide ring support 10 is disposed axially slidably and held non-rotatably. This slide ring support 10 carries at one end the central slide ring 11 which is provided with a central bore 11a. In a second cylinder chamber 12 which is arranged concentrically to the first cylinder chamber 7, an outer slide ring support 13 is also mounted axially slidably and non-rotatably. The second or outer slide ring support 13 carries a slide ring 14 which is concentric to the central slide ring 11. The concentric slide ring 14 is provided with several axial passages 14a arranged in a circle concentric to the axis of rotation. These passages 14a communicate via an annular channel 15 and several axial bores 16 with the second cylinder chamber 12. A second inlet channel 17 leads into the latter. The two slide ring supports 10 and 13 are of piston-like construction and sealed off from their associated cylinder chambers 7 and 12.

Between the outer circumference of the central slide ring 11 and the inner circumference of the concentric slide ring 14 there is provided an annular chamber 18 which extends as far as the sliding surface 8c of the common slide ring 8. The outer slide ring support 13 further comprises an annular piston 20 slidable in a third cylinder chamber 19 which is arranged concentrically between the other two cylinder chamber 7, 12. Between the inner circumference of the outer slide ring support 13 and its annular piston 20 and the inner slide ring support 10, and a housing or sleeve section 21 surrounding its cylinder chamber 7, is formed a second annular chamber 22 which makes the connection between the first annular chamber 18 and the third cylinder chamber 19. The third cylinder chamber 19 communicates with a third inlet channel 23 and an outlet channel 24. By means of the springs 25, 26 acting on the inner slide ring support 10 and the annular piston 20, the two slide rings 11 and 14 are biased against the sliding surface 8c of the common slide ring 8 with a basic load.

The slide rings 8, 11, 14 may be made of the usual slide ring materials or combinations of materials. For high speeds, it is advantageous if the slide rings 8, 11, 14 are made of silicon carbide. As this material has high compressive strength, but low tensile strength, it is advantageous if the slide ring supports 10, 13 surround the associated slide rings 11, 14 and the hollow shaft 2, and the portion 2a non-relatively rotatably connected thereto surrounds the common slide ring 8 radially from the outside with a bias or compressive force. In other words, the slide rings are shrink fitted in the slide ring supports as is the hollow shaft or the portion 2a connected thereto, whereby not only is a non-rotatable and sealing tight connection achieved between the slide rings and the associated supports, but also a radially inwardly directed compressive force is applied to the slide rings. At high speeds this radial bias prevents the slide rings from breaking out under centrifugal force.

On close examination of FIG. 1, it is discovered that the aerostatic mounting comprises only one thrust bearing 3a which supports the hollow shaft against displacement to the left. The thrust bearing acting in the opposite axial direction to thrust bearing 3a is advantageously formed by the slide rings 8, 11, 14.

If the rotating union is used together with a machine tool spindle, then the hollow shaft 2 rotates together with the machine tool spindle and the housing 1 is mounted stationarily. During rotation of the machine tool spindle, a first fluid of the connecting rod received in the extension 4a can be supplied to the central throughflow channel 4 via the central inlet channel 9, the slide ring support 10 and the bores 8a and 11a of the slide rings 8 and 11. This fluid may be a cooling lubricant needed for machining, deep drilling oil, cutting oil, water or even compressed air. If it is cooling lubricant, cutting oil, deep drilling oil or water and this is passed through in a fairly large quantity, then the slide rings 8, 11 are cooled and lubricated adequately. But if there is a low throughput, the fluid is pressureless, and operation is to be carried out dry with or without supply of compressed air, then cooling and lubrication of the slide rings 8, 11 is inadequate and they would soon be destroyed at high speeds. For this reason, through the third inlet channel 23 is supplied a liquid coolant, for example, cooling lubricant, which passes through the third cylinder chamber 19 and second annular chamber 22 into the first annular chamber 18. In the process it comes directly into contact with the slide rings 8, 11, 14 and also the inner slide ring support 10. As a result the slide rings 8, 11, 14 are cooled intensively and their sliding surfaces are lubricated too. After the coolant has absorbed the heat, it flows via the annular chamber 22 and the cylinder chamber 19 into the outlet channel 24.

A second fluid can be supplied via the second inlet channel 17, the cylinder chamber 12, the axial bores 16 and the passages 8d and 8b to the throughflow channels 5 both during rotation of the hollow shaft 2 and after stopping. In the case of a machine tool spindle with tool chuck, hydraulic oil is supplied to the release unit while the machine tool spindle and hollow shaft 2 are at a standstill. During rotation of these parts, on the other hand, no hydraulic oil flows and consequently at high speeds cooling of the concentric slide ring 14 is inadequate. Owing to additional cooling by means of the cooling lubricant passed through the annular chamber 18, however, sufficient cooling of all slide rings is ensured in any operative state. The annular chamber 18 also ensures removal of cooling lubricant or hydraulic oil which in certain circumstances escapes at the sliding surfaces of the central slide ring 11 or concentric slide ring 14. Hence in particular penetration of cooling lubricant into the hydraulic circuit is prevented.

The cooling lubricant introduced into the third cylinder chamber 19 via the inlet channel 23 also acts on the annular piston surface 20a facing away from slide ring 14. Due to the pressure of the cooling lubricant in cylinder chamber 19, therefore, the contact pressure of the slide ring 14 against the sliding surface 8c can be controlled and adapted to different operative states.

Figure 2:
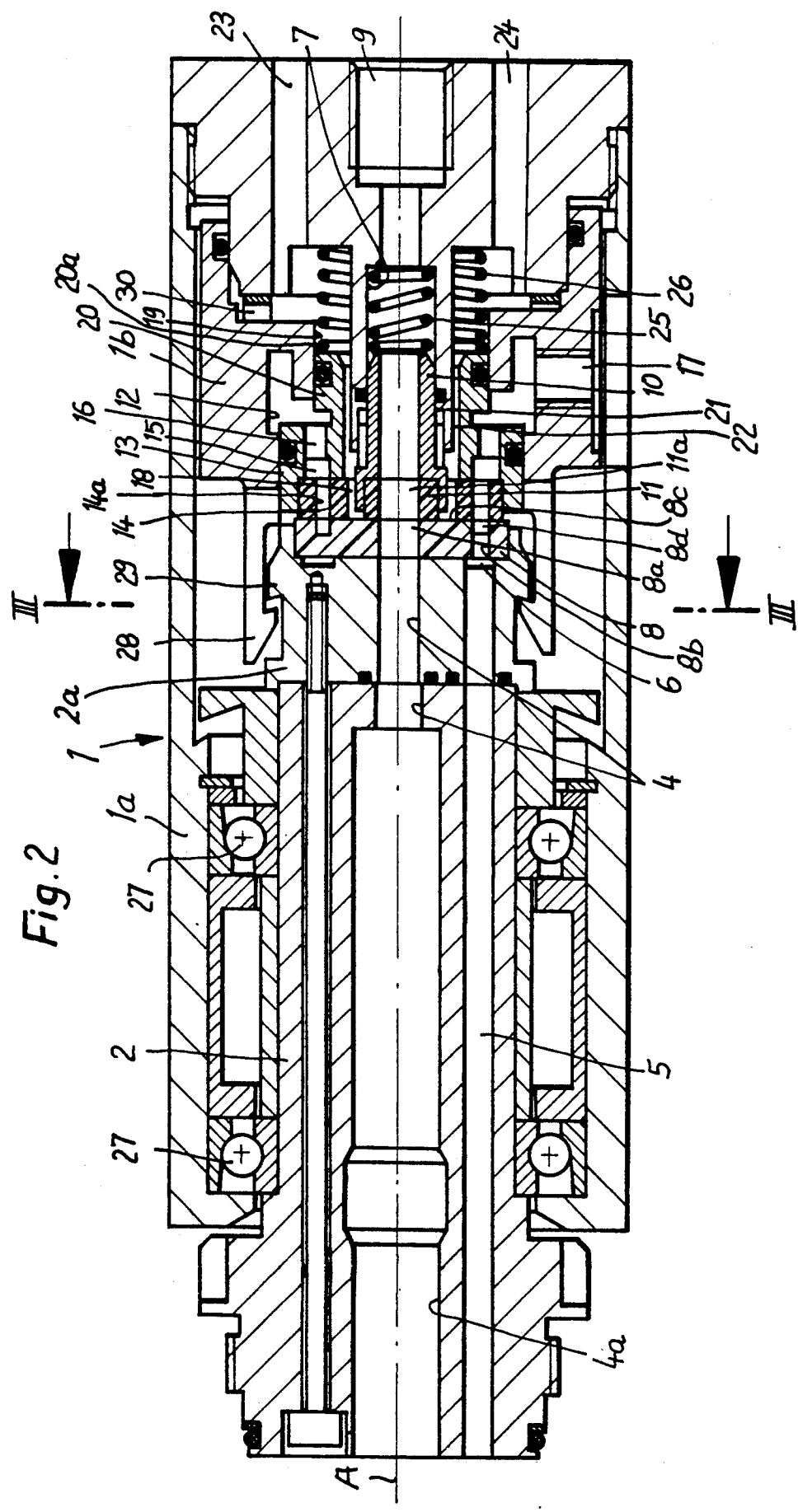
Figure 3:
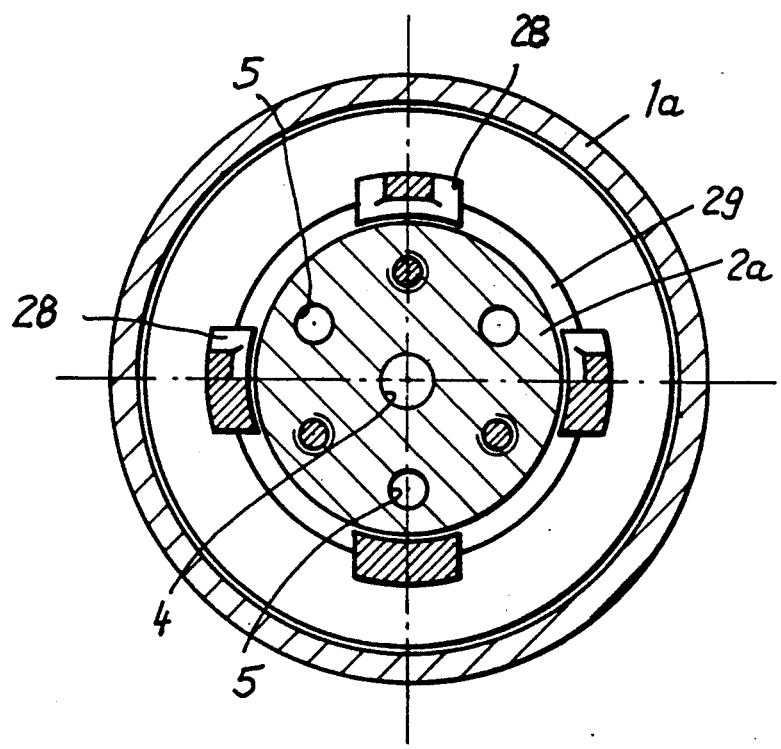

The embodiment shown in FIGS. 2 and 3 is to a large extent the same as the embodiment shown in FIG. 1. Components with the same function are therefore marked with the same reference numbers, and the above description applies analogously to the embodiment shown in FIGS. 2 and 3.

Instead of the aerostatic bearings, in the embodiment shown in FIGS. 2 and 3 two rolling bearings 27 are provided for mounting the hollow shaft 2. These two rolling bearings would be subjected to a very high static axial load if hydraulic oil is supplied to the release unit via the throughflow channels 5 at high pressure. The pressure may be up to 200 bar here. This pressure also acts in the second cylinder chamber 12 on the slide ring support 13 of piston-like construction and biases the concentric slide ring 14 against the common slide ring 8. The high contact pressure is necessary so that no hydraulic oil escapes at the sliding surfaces of the slide rings 8, 14. At the same time the high axial force caused by the high contact pressure would give rise to static overloading of the rolling bearings 27. To prevent this, in the embodiment shown in FIGS. 2 and 3 the housing 1 consists of housing portions 1a and 1b. The housing 1a is for its part naturally composed of two portions, but these are rigidly bolted together so that they form a self-contained unit and are therefore referred to as the first housing portion 1a. The second housing portion 1b is axially slidable relative to the first housing portion 1a. The outer slide ring support 13 is axially slidable in the second housing portion 1b. The second housing portion also contains the second cylinder chamber 12 and the second inlet channel 17. Moreover the annular piston 20 and its associated cylinder chamber 19 are provided in the second housing portion 1b. On the second housing portion 1b are also provided four claws 28 which engage behind an essentially radial annular shoulder provided at the inner end 2a of the hollow shaft 2. Between the two housing portions 1b and 1a is also provided an axially operating spring assembly which biases the second housing portion 1b in a direction towards the inner end 2a of the hollow shaft. For reasons of manufacturing technology, the inner end 2a forms a separate part which is rigidly bolted to the hollow shaft 2 and also sealed off from the hollow shaft.

If during rotation of the machine tool spindle no pressure or only a low pressure prevails in the cylinder chamber 12, then the spring assembly 30 biases the second housing portion 1b to the left, whereby the claws 28 are held at an axial distance from the annular shoulder 29. The free end 2a and the annular shoulder 29 can therefore turn unhindered relative to the claws 28. If however when the machine tool spindle is at a standstill, the pressure in the cylinder chamber 12 is increased to operate the release unit, then this pressure displaces housing portion 1b against the force of the spring assembly 30 to the right until the claws 28 abut against the annular shoulder 29. The concentric slide ring 14 is of course then also biased against the common slide ring 8 under high contact pressure, but this high contact pressure has no effect on the rolling bearings 27, as it is absorbed beforehand by the claws 28. While the claws 28 abut against the annular shoulder 29, the inner end 2a of the hollow shaft 2 and the axially slidable second housing portion 1b form a self-contained system. After elimination of the high pressure in the cylinder chamber 12, the parts return to their position shown at the top of FIG. 2.

The embodiments of the invention in which an exclusive property or privilege is claimed are defined as follows:

1. In a rotating union for first and second different fluids, which rotary union includes a stationary housing having a hollow shaft mounted rotatably therein and comprising a central throughflow channel therein for the first fluid and at least one second throughflow channel parallel thereto for the second fluid, two separate inlet channels in the housing being provided for the first and second fluids and a slide ring packing assembly provided between the inlet channels and the hollow shaft and arranged coaxially with an axis of rotation of the hollow shaft and through which the first and second fluids are supplied separately to the throughflow channels, the slide ring packing assembly including a common slide ring for conducting the first and second fluids which is connected at an interface with the inner end of the hollow shaft and comprises a central bore and several axial passages arranged in a circle concentric to the axis of rotation, and a central slide ring in the housing, as well as a concentric slide ring concentrically surrounding the central slide ring, each being held non-relatively rotatably in concentric piston-like slide ring supports and axially displaceable in associated cylinder chambers in the housing, and the respective opposing sliding surfaces are biased axially together independently of each other under spring pressure and the pressure of the respective fluid, the improvement wherein the concentric slide ring comprises several axial passages which are arranged in a circle concentric to the axis of rotation and connected to an inlet channel for the second fluid via a cylinder chamber for an outer one of the slide ring supports carrying the concentric slide ring, wherein at least one of the common slide ring and the concentric slide ring in the region of the axial passages in the respective sliding surface is provided with an annular groove connecting the axial passages to each other, wherein between the outer circumference of the central slide ring and the inner circumference of the concentric slide ring there is provided an annular chamber extending as far as the sliding surface on the common slide ring, wherein the housing further includes a third cylinder chamber in which is reciprocally slidably mounted an annular piston, wherein the annular chamber communicates with the third cylinder chamber, and wherein in the housing are provided a third inlet channel and an outlet channel which communicate with the third cylinder chamber.

2. The rotating union according to claim 1, wherein the third cylinder chamber is arranged concentrically between the annular chamber and a bore through the central slide ring and its respective support.

3. The rotating union according to claim 1, wherein between the inner circumference of the outer one of the slide ring supports and the annular piston and the outer circumference of the inner slide ring support and a housing section surrounding a bore through the central slide ring and its respective support, there is formed a second annular chamber which defines the connection between the annular chamber and the third cylinder chamber.

4. The rotating union according to claim 1, wherein the slide ring supports surround the associated slide rings radially from the outside with a bias.

5. The rotating union according to claim 1, wherein at least a portion of the hollow shaft surrounds the common slide ring radially from the outside with a bias.

6. The rotating union according to claim 1, wherein all the slide rings are made of silicon carbide.

7. The rotating union according to claim 1, wherein a compression spring acts on an annular piston surface on the annular piston, which surface faces away from the concentric slide ring.

8. The rotating union according to claim 1, wherein the housing consists of plural housing portions of which a first housing portion contains a mounting means for the hollow shaft and a second housing portion surrounds the slide ring packing assembly, wherein the second housing portion is axially slidable relative to the first housing portion, wherein the outer slide ring support is axially slidable in the second housing portion, wherein in the second housing portion the second inlet channel is provided and communicates with the cylinder chamber of the outer slide ring support, wherein on the second housing portion are provided several claws which engage behind an essentially radial annular shoulder adjacent the inner end of the hollow shaft, and wherein between the two housing portions is provided an axially operating spring assembly which biases the second housing portion in a direction towards the inner end of the hollow shaft and when the cylinder chamber is pressureless holds the claws at an axial distance from the annular shoulder.

9. The rotating union according to claim 1, wherein an aerostatic mounting with only one thrust bearing is provided for mounting the hollow shaft in the housing, and wherein the thrust bearing operating in the opposite axial direction to the latter is formed by the slide rings.

* * * * *